US010869032B1

(12) United States Patent
Shen et al.

(10) Patent No.: US 10,869,032 B1
(45) Date of Patent: Dec. 15, 2020

(54) ENHANCED ENCODING AND DECODING OF VIDEO REFERENCE FRAMES

(71) Applicant: Amazon Technologies, Inc., Seattle, WA (US)

(72) Inventors: Yueshi Shen, Cupertino, CA (US); Qi Keith Wang, Cambridge (GB); Ilya Vladimirovich Brailovskiy, Mountain View, CA (US); Renganathan Veerasubramanian, Pleasanton, CA (US); Yongjun Wu, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 329 days.

(21) Appl. No.: 15/344,060

(22) Filed: Nov. 4, 2016

(51) Int. Cl.
| | |
|---|---|
| *H04N 19/50* | (2014.01) |
| *H04N 19/176* | (2014.01) |
| *H04N 19/159* | (2014.01) |
| *H04N 19/105* | (2014.01) |
| *H04L 29/06* | (2006.01) |
| *H04N 19/172* | (2014.01) |

(52) U.S. Cl.
CPC ....... *H04N 19/105* (2014.11); *H04L 65/4069* (2013.01); *H04N 19/172* (2014.11)

(58) Field of Classification Search
CPC . H04N 19/105; H04N 19/172; H04L 65/4069
See application file for complete search history.

(56) References Cited

U.S. PATENT DOCUMENTS

| | | | |
|---|---|---|---|
| 9,131,110 B2 | 9/2015 | Yassur et al. | |
| 9,854,270 B2 | 12/2017 | Ramasubramonian et al. | |
| 2004/0001547 A1 | 1/2004 | Mukherje | |
| 2005/0012647 A1 | 1/2005 | Kadono et al. | |
| 2006/0188025 A1 | 8/2006 | Hannuksela | |
| 2009/0003440 A1* | 1/2009 | Karczewicz | H04N 19/00 375/240.11 |
| 2010/0166058 A1* | 7/2010 | Perlman | A63F 13/12 375/240.02 |
| 2012/0185570 A1 | 7/2012 | Bouazizi et al. | |
| 2014/0082054 A1 | 3/2014 | Denoual et al. | |

(Continued)

OTHER PUBLICATIONS

Author unknown; Adaptive Bitrate Streaming; Wikipedia; Retrieved Nov. 8, 2016 from https://en.wikipedia.org/wiki/Adaptive_bitrate_streaming.

*Primary Examiner* — Jamie J Atala
*Assistant Examiner* — Patrick E Demosky
(74) *Attorney, Agent, or Firm* — K&L Gates LLP

(57) ABSTRACT

Methods of video streaming are generally described. In some examples, the methods may be performed by a server device and may include generating first intra-coded frame (I-frame) data and a plurality of enhancement layer data corresponding to the first I-frame data. The methods may further include sending the first I-frame data to a client device. The methods may further include transmitting first enhancement layer data to the client device. The methods may include sending first inter-coded frame data to the client device. In some examples, the first inter-coded frame data can be decoded by referencing first reference frame data generated by combining the first I-frame data and the first enhancement layer data.

19 Claims, 8 Drawing Sheets

(56) References Cited

U.S. PATENT DOCUMENTS

| | | | |
|---|---|---|---|
| 2014/0254669 A1* | 9/2014 | Rapaka | H04N 19/50 |
| | | | 375/240.12 |
| 2015/0049806 A1* | 2/2015 | Choi | H04N 19/597 |
| | | | 375/240.12 |
| 2015/0085927 A1 | 3/2015 | Sjöberg et al. | |
| 2015/0139325 A1* | 5/2015 | Chuang | H04N 19/51 |
| | | | 375/240.16 |
| 2015/0334420 A1 | 11/2015 | DeVleeschauwer et al. | |
| 2016/0150236 A1* | 5/2016 | Maeda | H04N 19/90 |
| | | | 375/240.08 |
| 2016/0330453 A1 | 11/2016 | Zhang et al. | |
| 2017/0359596 A1 | 12/2017 | Kim et al. | |

* cited by examiner

ENHANCED ENCODING AND DECODING OF VIDEO REFERENCE FRAMES

BACKGROUND

Video and/or other media may be sent between computing devices over a network. In some examples, videos may be encoded by a server, sent to a client computing device, decoded and played back while subsequent portions of the video are still being transmitted to the client computing device by the server. Such video transmission and playback is often referred to as "streaming". Network conditions can change during streaming due to changes and/or increases in network traffic. For example, network conditions may sometimes deteriorate which may lead to delays in streaming of video and/or other media files.

Provided herein are technical solutions to improve sending of video and other types of data that may reduce problems associated with changing network conditions.

DETAILED DESCRIPTION

Figure 1A:
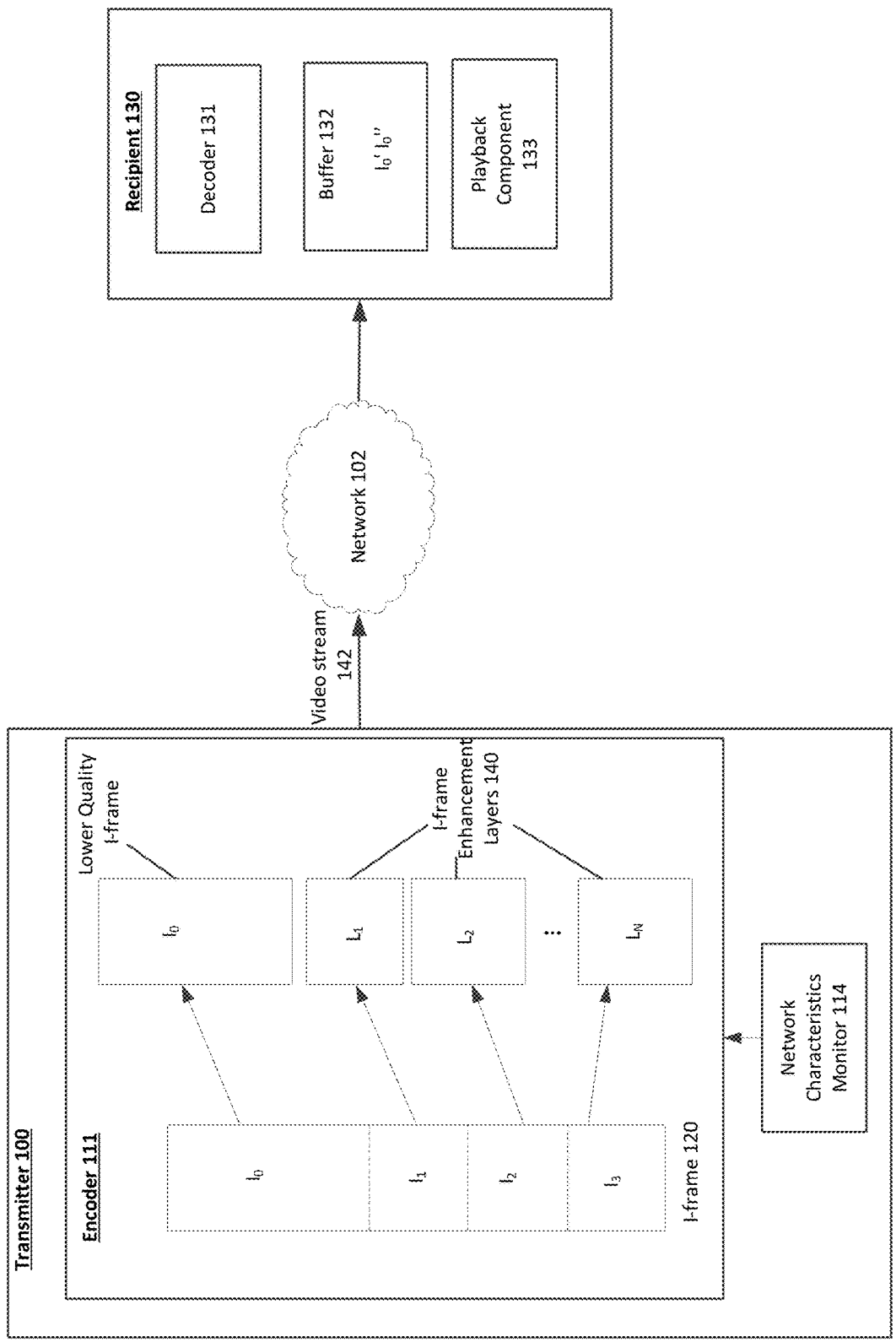
FIG. 1A depicts a system for enhanced encoding and decoding of a video bit stream, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

The transmission and presentation of information using streaming delivery technology is rapidly increasing. Various forms of streaming technology and, in particular, hypertext transfer protocol (HTTP) streaming, may employ adaptive bitrate streaming, in which a video stream is encoded using multiple renditions that may differ with respect to various transmission attributes (e.g., bitrates, resolutions, profiles, frame rates, etc.). In adaptive bitrate streaming, video streams are encoded into small segments (typically 2-10 seconds), and each segment starts with an instantaneous decoder refresh frame (IDR-frame). An IDR-frame is a special intra-coded picture frame (I-frame) that causes all reference pictures in the DPB (decoded picture buffer) to be flushed, so that no subsequent video frames can reference any picture prior to the IDR-frame. This means that each segment is self-decodable (i.e., doesn't depend on reference pictures in previous segments).

One challenge related to adaptive bitrate streaming is the desire to reduce end-to-end latency, jitter, and other undesirable effects caused by network conditions while maintaining a sufficiently high video quality. In adaptive bitrate streaming, larger segment durations may tend to increase latency. Thus, one simple technique for reducing latency involves the reduction of segment duration. However, the reduction of segment duration may result in more frequent transmission of I-frames, which have large data sizes and are computational resource intensive and inefficient to encode. Transmission of the I-frames can cause spikes in network traffic due to the larger data size of such frames relative to inter-coded frames.

Techniques for improved encoding and decoding of reference frames used in video streaming are described herein. In digital video technology, a video may be represented by a number of video frames that may be displayed in sequence during playback. A video frame is comprised of rows and columns of pixels. The resolution of a particular video frame is described by the width of the frame, in terms of a first number of pixels, by the height of the frame, in terms of a second number of pixels. Video frames may be compressed using different picture types or frame types, such as Intra-coded picture frames, predicted picture frames, and/or bi-predictive frames. The term "frame" can refer to an entire image captured during a time interval (e.g., all rows and columns of pixels comprising the particular image). The term "picture" can refer to either a frame or a field. A "field" is a partial image of a frame, which can be represented by either the odd-numbered or even-numbered scanning lines of the frame. Reference frames are frames of a compressed video that are used to define future frames and come in various types. A compressed video may comprise one or more frames that do not include all of the pixel data within the frames themselves, but rather reference pixel values of other frames (e.g., reference frames). Intra-coded picture frames ("I-frames") include detailed pixel data in order to be self-decodable and to provide reference pixel values for other inter-coded picture frames. As a result, I-frames do not require other video frames in order to be decoded, but provide the lowest amount of data compression. Predicted picture frames ("P-frames") contain only the changes in the pixel values from the previous frame, and therefore P-frames use data from previous frames to decompress the P-frame. As a result, P-frames are more compressible than I-frames. Bi-predictive picture frames ("B-frames") can be decoded using both previous and forward frames for data reference. As set forth above, frequent transmission of I-frames can cause network congestion and/or jitter because of their increased size (e.g., the number of bits of data comprising the I-frame) relative to the P-frames and B-frames. In accordance with embodiments of the present invention, frames used as reference frames in video streaming may be divided into multiple parts comprising a lower quality reference frame and a number of reference frame enhancement layers. For example, full quality I-frame data may be divided into multiple parts for transmission, the multiple parts comprising lower (e.g., reduced) quality I-frame data and a plurality of I-frame enhancement layer data. In various other examples, lower quality I-frames and enhancement layer data used to enhance the reference quality of the lower quality I-frames may be generated from "raw" image data, such as image data captured by an image sensor of a camera. The size of the lower quality I-frame data may be referred to as "lower" herein because the number of bits comprising the lower quality I-frame may be less than the number of bits required to store an enhanced quality I-frame resulting from the combination of the lower quality I-frame with one or more I-frame enhancement layer data. In some examples, the size of the lower quality I-frame may be less than the size of the full quality I-frame from which the lower quality I-frame was generated. In some further examples, the size of the lower quality I-frame, in terms of a number of bits, may be similar to, or less than, data sizes of other inter-coded video frames, such as the P-frames and/or B-frames of the particular video stream being encoded. Accordingly, sending lower quality I-frames may not result in the spikes in network traffic characteristic of full-quality I-frames because the sizes of those lower quality I-frames more closely compares to the sizes of the P-frames and/or B-frames. Each of the I-frame enhancement layers may be combined with and sent together with one of the subsequent inter-coded frames such as P-frames and/or B-frames in order to normalize frame data size among the frames of the particular adaptive bitrate video stream being encoded and sent to one or more recipient computing devices. For example, I-frame enhancement layer data may be sent together with subsequent P-frame or B-frame data by including the I-frame enhancement layer data in a payload of a transmission packet along with P-frame and/or B-frame data. Although the examples described herein generally refer to improved encoding and decoding techniques for I-frames, it will be understood that these techniques may be applied to any reference frame. For example, a P-frame may be divided into a lower quality P-frame and one or more P-frame enhancement layers, for transmission. Additionally, techniques such as those described herein, may be applied to other types of reference data that may be sent over a network using transmission packets that are relatively small in terms of a number of bits. Upon receipt, a recipient device may incrementally improve the quality of reference data by assembling a larger, more detailed file from the data from the plurality of transmission packets while reducing the amount of bandwidth required for transmission. Subsequently received files may benefit from the incrementally improved reference data.

Upon receipt of the video stream encoded in accordance with the techniques described above, a recipient computing device may reconstruct the full-quality reference frame (e.g., a full quality I-frame) by combining the lower quality reference frame data (e.g., lower quality I-frame data) and the plurality of enhancement layer data (e.g., I-frame enhancement layer data) which have been received and stored in memory. The recipient computing device may incrementally improve the reference quality of the lower quality reference frame (e.g., an I-frame) by incorporating image data of each enhancement layer (e.g., I-frame enhancement layer data) with the image data of the previously-enhanced reference frame until the image data of the full-quality reference frame (e.g., a full-quality I-frame) is reassembled in memory. Each subsequent inter-coded frame may benefit from incremental increases in reference quality due to the enhancement of the lower quality reference frame with received reference frame enhancement layers.

FIG. 1 depicts a transmitter 100 (e.g., one or more server computers) effective to encode a video stream for delivery to one or more recipients 130 (e.g., client computing devices) over a network 102, in accordance with various embodiments of the present disclosure. Network 102 may be, for example, a local area network (LAN) and/or a wide area network (WAN) such as the Internet. The video stream may be sent from transmitter 100 as video stream 142. Video stream 142 may include multiple renditions or may include a single rendition. Video stream 142 may be organized into video frames by encoder 111 of transmitter 100. A video frame may be, for example, a raster of pixels, with each pixel comprising a pixel value. Video frames may be sent from transmitter 100 over network 102 and received and presented by recipients 130 using streaming technology, in which a portion of the video stream may be presented by a recipient while subsequent portions of the video stream are simultaneously being sent to the recipient. For example, a prior portion of a video stream may be decoded and displayed by a recipient at the same time that a subsequent portion of the video stream 142 is still being sent to the recipient. In some examples, the encoded and transmitted image information may correspond to a live or nearly-live (e.g., with a short time delay of, for example, less than a few tenths of a second, less than a few seconds or less than a few minutes) transmission of an event, such as a playing of a video game, a news conference, real-time video conferencing, a sporting event, and many others. A live or nearly-live transmission of an event that is delivered using streaming technology may be referred to as live-streaming. It is noted however, that the transmission of information depicted in FIG. 1 is not limited to live or nearly-live transmission and may also include sending prior-recorded events, media, or other information. In some examples, video stream 142 may be sent to a recipient 130 as part of a large-scale video broadcast, in which video stream 142 is broadcast to a large quantity of recipients 130. It is noted however, that the enhanced I-frame encoding and decoding techniques disclosed herein are not limited to large-scale video broadcasts and may also be employed for smaller-scale video broadcasts or even for video stream transmissions to a single recipient.

In the example of FIG. 1, transmitter 100 includes an encoder 111 for encoding of video stream 142 for transmission to recipient 130. In various examples, encoder 111 may comprise a dedicated video encoder integrated circuit and/or video encoding software executable on a general purpose computer. Additionally, recipient 130 may include a respective decoder 131 for decoding of video stream 142. In various examples, decoder 131 may comprise a dedicated video decoder integrated circuit and/or video decoding software executable on a general purpose computer. Recipient 130 may also include one or more playback components 133 for playback of the sent video stream. Playback component 133 may be, for example, a media player, web browser, and/or another playback component software application executed using one or more processors of a computing device. In some examples, decoder 131 may be wholly or partially included within or integrated with one or more playback components 133. In some examples, video stream 142 may be sent using a communications protocol that is commonly employed for adaptive bitrate streaming, such as hypertext transfer protocol (HTTP).

In some examples, a transmitted video stream may be encoded using a number of different renditions, which may each differ from one another with respect to one or more image quality-related attributes, such as bitrates, resolutions, profiles, frame rates, and others. Accordingly, in various examples, encoder 111 may encode video stream 142 in multiple, different renditions.

Encoder 111 may be effective to encode data into one or more frames, such as I-frames, P-frames, and B-frames described herein. Encoder 111 may be effective to identify an I-frame 120 or other reference frame. In an example, I-frame 120 may be a first I-frame of a segment of the video stream 142. As previously noted, an I-frame is typically much larger in size in terms of an amount of memory needed to store an I-frame relative to inter-coded frames such as P-frames or B-frames. Encoder 111 may be effective to convert I-frame 120 into a lower quality I-frame $I_0$ and a plurality of I-frame enhancement layers 140 (including I-frame enhancement layers $L_1, L_2, \ldots, L_N$). In some examples, lower quality I-frame $I_0$ may be of a lower bitrate relative to I-frame 120, but may be the same resolution. In some other examples, encoder 111 may generate lower quality I-frame $I_0$ from data that has not been previously encoded and/or compressed into a video format including intra-coded and/or inter-coded reference frames.

Figure 1B:
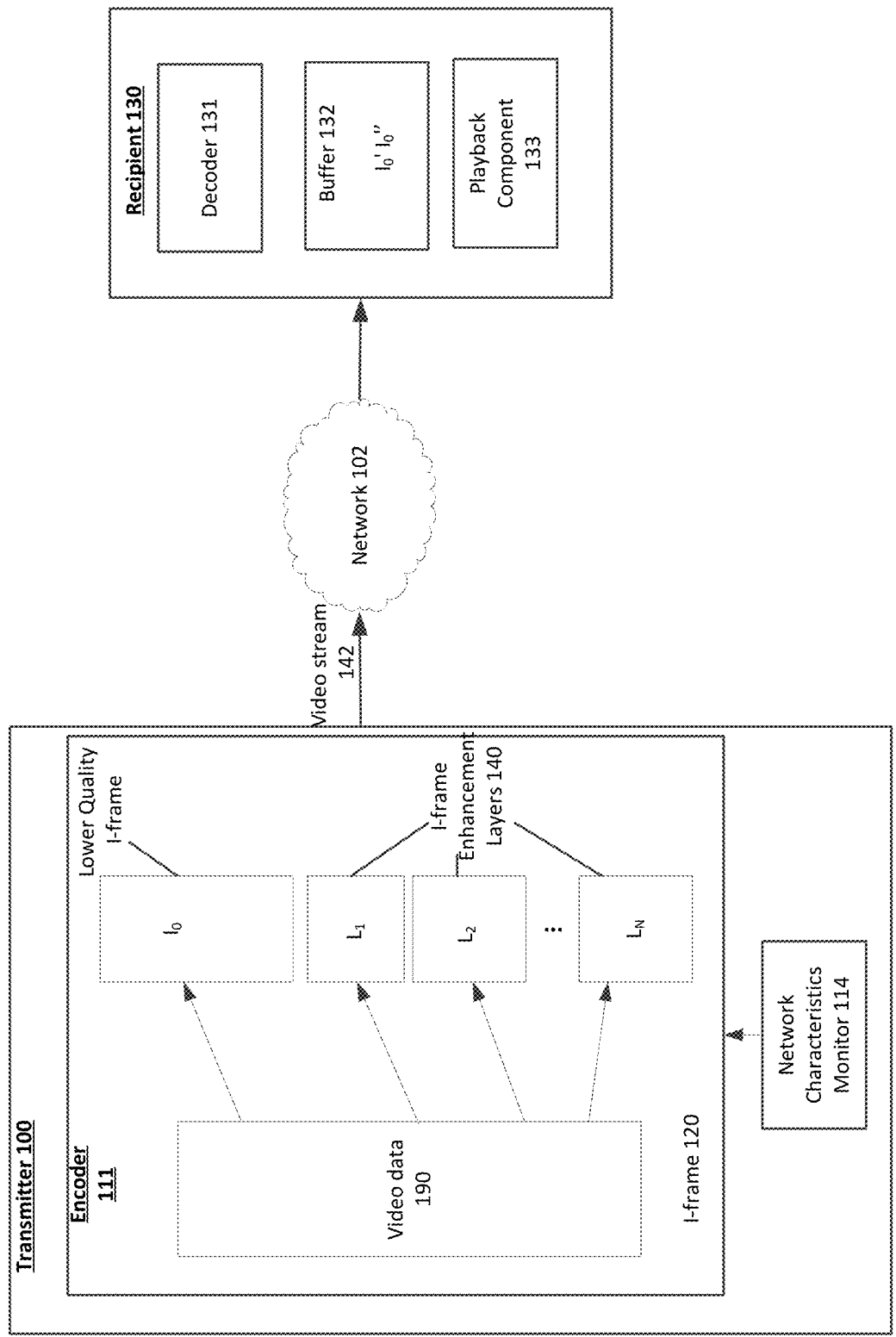
FIG. 1B depicts another system for enhanced encoding and decoding of a video bit stream, in accordance with embodiments of the present disclosure.

For example, as depicted in FIG. 1B, encoder 111 may receive video data 190. In some examples, video data 190 may be "raw" image data received from an image sensor of a camera and/or may be video data encoded into a non-native format with respect to a video format used by encoder 111 and/or decoder 131. Encoder 111 may be effective to encode video data 190 into a series of frames, such as the I-frames, P-frames, and/or B-frames described herein. Therefore, although conversion of a full-quality I-frame 120 into a lower quality I-frame $I_0$ is sometimes referred to and described herein, lower quality I-frame $I_0$ may be generated from previously un-encoded video data, such as video data 190. Similarly, enhancement layers 140 may be generated from video data 190. A lower quality I-frame $I_0$ generated from video data 190 may be referred to as "lower quality" because the I-frame $I_0$ may comprise less detailed pixel data relative to an enhanced quality I-frame $I_0'$ generated by incorporating image data of one or more enhancement layers into image data of lower quality I-frame $I_0$, as will be described in further detail below.

Encoder 111 may divide the data comprising I-frame 120 to generate a lower quality I-frame $I_0$ having a lower bitrate relative to I-frame 120 and one or more I-frame enhancement layers 140 (represented in FIG. 1 as $L_1, L_2, \ldots, L_N$). As previously described, instead of dividing an I-frame 120 to generate lower quality I-frame $I_0$, lower quality I-frame $I_0$ may be generated from video data 190. Dividing an I-frame 120 to generate a lower quality I-frame $I_0$ may comprise deleting image data from I-frame 120 that is included in enhancement layers 140. Enhancement layers 140 may comprise image data that may be used to augment the quality of lower quality I-frame $I_0$. Image data may be data related to pixels of the original I-frame 120. Some examples of image data may include color value data, chroma/chrominance value data, luma/luminance value data and/or difference values between a current pixel value and a pixel value from a previous frame in video stream 142. Image data may be combined with and/or incorporated into current reference frame image data to improve the quality of a reference frame. For example, JPEG2000 pixel values may be comprised of various frequency bands. Image data included in enhancement layers $L_1, L_2, \ldots, L_N$ may be used to progressively improve the quality of pixel data in a current reference frame (e.g., lower quality I-frame $I_0$) by progressively combining different frequency bands of pixel data with the image data of the current reference frame. For example, a first enhancement layer $L_1$ may include a low frequency band of pixel data. Enhancement layer $L_1$ may be combined with lower quality I-frame $I_0$ to add low frequency pixel data to the reference frame $I_0$, resulting in a first enhanced quality I-frame $I_0'$. A second enhancement layer $L_2$ may include a higher frequency band of pixel data. Enhancement layer $L_2$ may be combined with first enhanced quality I-frame $I_0'$ to add high frequency pixel data to first enhanced quality I-frame $I_0'$, resulting in a second enhanced quality I-frame $I_0''$.

In another example, I-frame enhancement layer $L_1$ may include image data providing additional details related to chroma, chrominance, luma, luminance, or other parameters associated with pixels in I-frame 120. As will be described in further detail below, decoder 131 of recipient 130 may combine I-frame enhancement layer $L_1$ with lower quality I-frame $I_0$. After combination of I-frame enhancement layer $L_1$ with lower quality I-frame $I_0$, the I-frame resulting from the combination will be enhanced relative to lower quality I-frame $I_0$ since the enhanced I-frame includes new image data not included in lower quality I-frame $I_0$. Accordingly, the enhanced I-frame resulting from the combination of I-frame enhancement layer $L_1$ and lower quality I-frame $I_0$ may provide a better reference for decoding subsequently-received P-frames and/or B-frames.

In various examples, decoder 131 of recipient 130 may combine I-frame enhancement layers $L_1, L_2, \ldots, L_N$ with lower quality I-frame $I_0$ upon receipt of each of the I-frame enhancement layers $L_1, L_2,$ and $L_N$. The enhanced I-frames resulting from the combination of lower quality I-frame $I_0$ and one or more I-frame enhancement layers 140 may be stored in a buffer 132 of recipient 130. Buffer 132 may be a memory configured to be in communication with decoder 131 and one or more processing units of recipient 130. Additionally, in some examples, upon the creation of a new enhanced I-frame (e.g., I-frames $I_0'$ and/or $I_0''$) based on receipt of an additional I-frame enhancement layer 140, the previous I-frame corresponding to the same time in video stream 142 may be overwritten in, or otherwise removed from, buffer 132.

For example, recipient 130 may initially receive lower quality I-frame $I_0$ at a first time $t_0$. Thereafter, at a second time $t_1$, recipient 130 may receive a first I-frame enhancement layer $L_1$ corresponding to lower quality I-frame $I_0$. I-frame enhancement layer $L_1$ may correspond to lower quality I-frame $I_0$ because I-frame enhancement layer $L_1$ and lower quality I-frame $I_0$ were both created from the same full-quality, larger-sized I-frame 120. Decoder 131 may combine image data of I-frame enhancement layer $L_1$ with lower quality I-frame $I_0$ to produce a first enhanced quality I-frame $I_0'$. First enhanced quality I-frame $I_0'$ may be stored in buffer 132 for use as a reference by subsequently-received inter-coded frames. Thereafter, at a second time $t_2$ recipient 130 may receive a second I-frame enhancement layer $L_2$ corresponding to lower quality I-frame $I_0$. Decoder 131 may combine image data of I-frame enhancement layer $L_2$ with first enhanced quality I-frame $I_0'$ to produce a second enhanced quality I-frame $I_0''$. Upon generation of second enhanced quality I-frame $I_0''$, decoder 131 may overwrite first enhanced quality I-frame $I_0'$ in buffer 132 with second enhanced quality I-frame $I_0''$. Second enhanced quality I-frame $I_0''$ may include all of the image data included in first enhanced quality I-frame $I_0'$ plus additional image data included in second I-frame enhancement layer $L_2$. Once recipient 130 has received all of the I-frame enhancement layers 140 ($L_1$, $L_2$, and $L_3$, in the current example) decoder 131 may be effective to reproduce full quality I-frame 120 by combining lower quality I-frame $I_0$ with each of the subsequently received I-frame enhancement layers 140. Sending I-frame 120 as a smaller-sized lower quality I-frame $I_0$ and a series of separately sent I-frame enhancement layers 140 can avoid problems associated with sending very large I-frames followed by a series of smaller-sized inter-coded frames. Such differences in frames size can cause unfavorable network conditions such as latency and jitter, and can cause buffer overflow on the recipient device. Accordingly, converting a full quality I-frame, such as I-frame 120 into a smaller, lower quality I-frame $I_0$ and a series of enhancement layers 140 can reduce the variance in frame size for frames sent over network 102. In various examples, encoder 111 may select the size of lower quality I-frame $I_0$ when generating lower quality I-frame $I_0$ from full quality I-frame 120. Encoder 111 may consider various factors when determining a size of lower quality I-frame $I_0$ and/or when determining how many I-frame enhancement layers to generate for a particular full-quality I-frame 120. Such factors may include available bandwidth on a communication channel between transmitter 100 and recipient 130, average jitter and/or latency on the communication channel between transmitter 100 and recipient 130, the average size of inter-coded frames of video stream 142, and/or characteristics of recipient 130, such as a size of buffer 132 and/or a speed or type of decoding being used by decoder 131.

Figure 2:
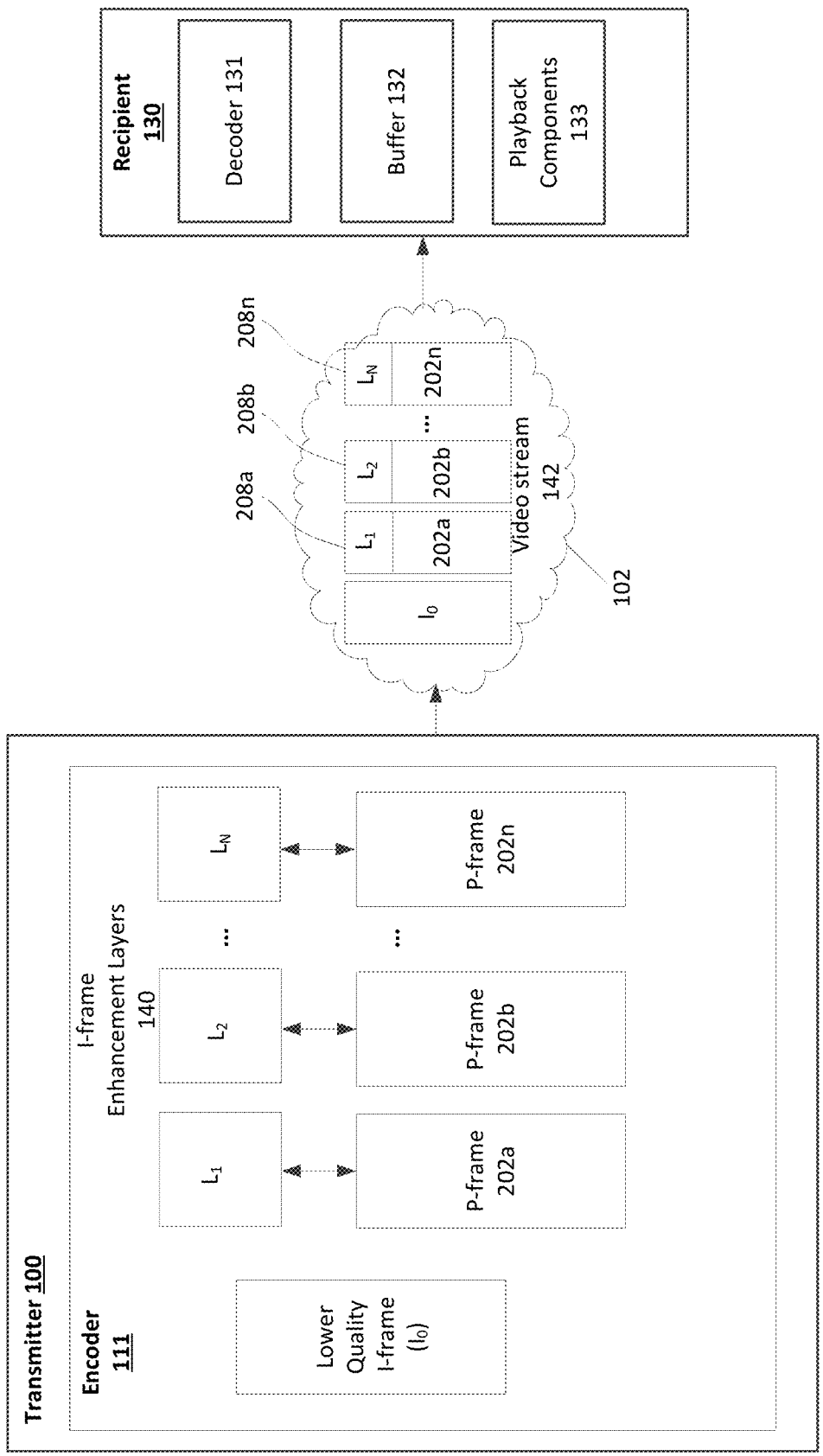
FIG. 2 depicts a transmitter computing device effective to encode a lower quality I-frame and a plurality of I-frame enhancement layers, in accordance with various embodiments of the present disclosure.

FIG. 2 depicts a transmitter computing device effective to encode a lower quality I-frame $I_0$ and a plurality of I-frame enhancement layers 140, in accordance with various embodiments of the present invention. Those components of FIG. 2 described above with respect to FIG. 1 may not be described again herein for purposes of clarity and brevity. In some examples, encoder 111 may combine I-frame enhancement layers 140 with various inter-coded frames such as P-frames or B-frames for transmission from transmitter 100 to recipient 130. For example, the image data of I-frame enhancement layers 140 may be included in a payload of one or more P-frames 202. In the example shown in FIG. 2, encoder 111 may combine I-frame enhancement layers $L_1$, $L_2$, ..., $L_N$ with respective P-frames 202a, 202b, ..., 202n. P-frames 202a, 202b, ..., 202n may be sequential or non-sequential frames in video stream 142. Combination frames resulting from the combination of an I-frame enhancement layer 140 and an inter-coded frame may be referred to herein as a "hybrid block." Hybrid blocks may be frames generated for transmission between a server computing device and one or more recipient computing devices. Hybrid blocks may be of a smaller size, in terms of a number of bits, relative to original I-frame 120. Encoder 111 may encode indicator data in a NAL header of a hybrid block to identify and differentiate between inter-coded frame data and I-frame enhancement layer data. Additionally, indicator data included in the NAL header of a hybrid block may be effective to indicate how such a block should be decoded by decoder 131. For example, indicator data in a header of a hybrid block may indicate that the first 128 bytes of data in the payload of the hybrid block represent the I-frame enhancement layer data. The header may further include data identifying the particular I-frame that is to be enhanced using the I-frame enhancement layer data. For example, the header may include a time stamp identifying the particular I-frame to be enhanced from among other frames of video stream 142.

In various examples, encoder 111 may select particular inter-coded frames for combination with I-frame enhancement layers 140 so that the resulting hybrid blocks are less than or equal to a target frame size. Additionally, the lower quality I-frame $I_0$ may be generated to be less than or equal to the target frame size. Accordingly, frame size may be normalized in the video stream 142. For example, a size of lower quality I-frames $I_0$ may be selected that is within a tolerance band (e.g., +/−0.5%, 1%, 2%, 5%, 15%, 17%, 25%, 26.3%, etc.) of a target frame size. Similarly, particular inter-coded frames may be selected for combination with particular I-frame enhancement layers 140 so that the resulting hybrid blocks are within a tolerance band of the target frame size.

In the example depicted in FIG. 2, encoder 111 has generated lower quality I-frame $I_0$ and I-frame enhancement layers $L_1$, $L_2$, ..., $L_N$ from full quality I-frame 120 (shown in FIG. 1). As previously described, in some examples, instead of dividing an I-frame 120 to generate lower quality I-frame $I_0$, encoder 111 may generate lower quality I-frame $I_0$ from video data 190. Encoder 111 combines I-frame enhancement layers $L_1$, $L_2$, ..., $L_N$ with respective P-frames 202a, 202b, ..., 202n to form hybrid blocks 208a, 208b, ..., 208n. In some examples, hybrid blocks 208a, 208b, ..., 208n generated by encoder 111 may be within a specified tolerance of a target frame size. Transmitter 100 may send lower quality I-frame $I_0$ and hybrid blocks 208a, 208b, 208n over network 102 to recipient 130. It should be noted that although in the example depicted in FIG. 2, the I-frame enhancement layers $L_1$, $L_2$, ..., $L_N$ are combined with P-frames 202a, 202b, ..., 202n, I-frame enhancement layers $L_1$, $L_2$, ..., $L_N$ could instead be combined with other types of inter-coded frames, such as B-frames.

Figure 3:
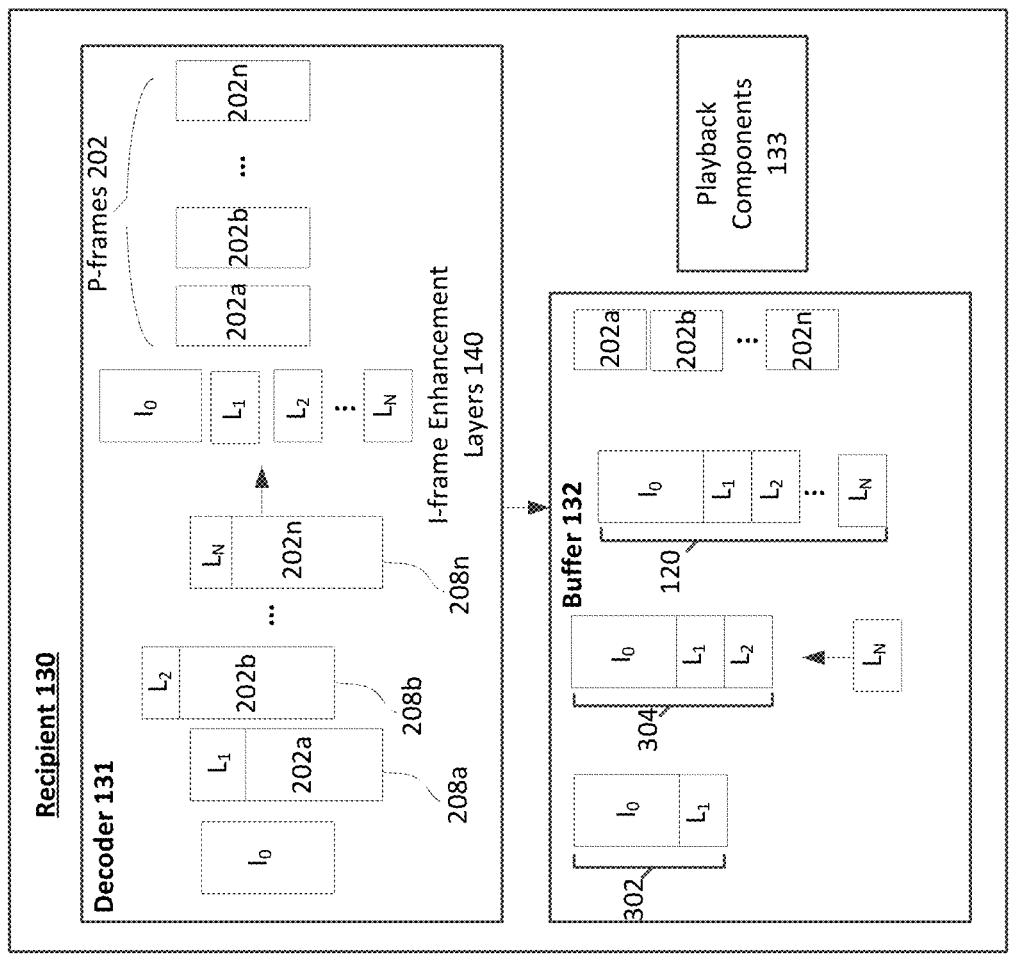
FIG. 3 depicts a recipient computing device effective to decode the lower quality I-frame and the plurality of hybrid blocks depicted in FIG. 2, in accordance with embodiments of the present disclosure.

FIG. 3 depicts a recipient computing device 130 effective to decode the lower quality I-frame $I_0$ and the plurality of hybrid blocks 208 depicted in FIG. 2, in accordance with embodiments of the present invention. Those components of FIG. 3 described previously with respect to FIGS. 1-2 may not be described again herein for purposes of clarity and brevity.

As illustrated in FIG. 3, decoder 131 of recipient 130 may receive lower quality I-frame $I_0$. Decoder 131 may decode lower quality I-frame $I_0$ and store the lower quality I-frame $I_0$ in buffer 132. Decoder 131 may receive hybrid blocks 208a, 208b, ..., 208n. Header data, such as NAL header data of hybrid blocks 208a, 208b, ..., 208n, may be used by decoder 131 to identify and separate hybrid blocks 208a, 208b, ..., 208n. For example, header data may be used by decoder 131 to separate hybrid blocks into I-frame enhancement layer data, such as image data for I-frame 120 (shown in FIG. 1A), and inter-coded P-frame data, such as data required to decode and display P-frames 202. Header data may include one or more indicator bits and/or flags specifying locations of the relevant portions of inter-coded frame data and/or I-frame enhancement layer data and identifying the inter-coded frame data and/or I-frame enhancement layer data.

As indicated by the arrow depicted within decoder 131 in FIG. 3, upon receipt of a particular hybrid block decoder 131 may separate the I-frame enhancement layer data included in the hybrid block from the inter-coded frame data. In an example, recipient 130 may receive lower quality I-frame $I_0$ at a time $t_0$. Decoder 131 may decode lower quality I-frame $I_0$ and store $I_0$ in buffer 132, as indicated by the downward arrow between decoder 131 and buffer 132. While lower quality I-frame $I_0$ is stored in buffer 132, $I_0$ may be used as a reference to decode subsequently-received and/or concurrently received inter-coded frames. Recipient 130 may receive hybrid block 208a at a time $t_1$. Decoder 131 may separate I-frame enhancement layer $L_1$ (including image data of I-frame enhancement layer $L_1$) from P-frame data 202a. P-frame data 202a may be stored in buffer 132. Decoder 131 may combine image data of I-frame enhancement layer $L_1$ with lower quality I-frame $I_0$ to produce a first enhanced quality I-frame 302. In some examples, decoder 131 may use first enhanced quality I-frame 302 as a reference frame to decode P-frame data 202a. In various other examples, first enhanced quality I-frame 302 may be used as a reference for subsequently received inter-coded frames (e.g., P-frame data 202b). As described previously, adding I-frame enhancement layer data, such as pixel value differences and/or updates, to a lower quality I-frame $I_0$ (such as lower quality I-frame $I_0$) may increase the quality of the newly modified I-frame (e.g., first enhanced quality I-frame 302) such that the newly modified frame may provide a better reference for subsequent inter-coded frames. Decoder 131 may store first enhanced quality I-frame 302 in buffer 132. First enhanced quality I-frame 302 may be used as a reference to decode subsequently-received inter-coded frames while first enhanced quality I-frame 302 is stored in buffer 132.

To continue the example, recipient 130 may receive hybrid block 208b at a time $t_2$. Decoder 131 may separate I-frame enhancement layer data $L_2$ (including image data of I-frame enhancement layer $L_2$) from P-frame data 202b. P-frame data 202b may be stored in buffer 132. Decoder 131 may combine I-frame enhancement layer $L_2$ with first enhanced quality I-frame 302 to produce a second enhanced quality I-frame 304. Adding additional enhancement layer data, such as pixel value updates and/or differences, to first lower quality I-frame 302 to produce second enhanced quality I-frame 304 may provide a better reference frame for subsequently-received inter-coded frames. Decoder 131 may store second enhanced quality I-frame 304 in buffer 132. Second enhanced quality I-frame 304 may be used as a reference to decode subsequently-received inter-coded frames while second enhanced quality I-frame 304 is stored in buffer 132.

Decoder 131 may continue to receive and separate hybrid blocks until a final hybrid block 208n is received for a particular full-quality I-frame 120 at a time $t_N$. Decoder 131 may separate I-frame enhancement layer data $L_N$ from P-frame data 202n. P-frame data 202n may be stored in buffer 132. Decoder 131 may combine I-frame enhancement layer $L_N$ with the currently-stored enhanced quality I-frame (e.g., second enhanced quality I-frame 304 or the most recently stored enhanced quality I-frame) to reassemble full-quality I-frame 120. Decoder 131 may store full quality I-frame 120 in buffer 132. Full-quality I-frame 120 may be used as a reference to decode subsequently-received inter-coded frames until an instantaneous decode refresh frame (IDR frame) is used to clear buffer 132.

Figure 4:
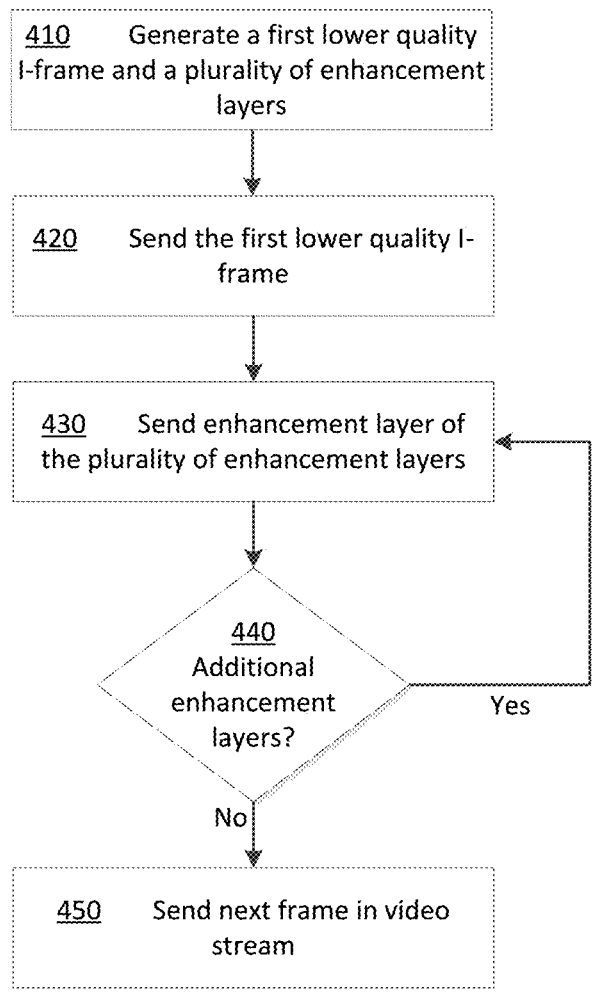
FIG. 4 depicts a flowchart illustrating an example process for enhanced I-frame encoding, in accordance with embodiments of the present disclosure.

FIG. 4 is a flowchart illustrating a first example process for enhanced I-frame encoding that may be used in accordance with the present disclosure. In some examples, the process of FIG. 4 may be performed by a transmitter computing device (e.g., server) that receives a request for a video streaming transmission, such as transmitter 100 depicted in FIGS. 1A and 1B. In some examples, transmission of a video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 4 may be performed prior to receiving a request for a video streaming transmission. For example, the process of FIG. 4 may be performed to encode video data received from a camera or other device for later transmission or streaming.

The process of FIG. 4 may begin at operation 410 at which a first lower quality I-frame and a plurality of enhancement layers is generated. For example, transmitter 100 may identify a first I-frame (e.g., I-frame 120 of FIG. 1) of the requested video stream (e.g., video stream 142 depicted in FIG. 1). An encoder of transmitter 100 may divide the data comprising the identified I-frame into a lower quality I-frame and a plurality of enhancement layers corresponding to the lower quality I-frame. For example, with reference to FIG. 1, encoder 111 may identify I-frame 120 which may be a frame of 0.5 MB in size (in various examples, I-frames may typically range between 100 kB-700 kB in size, depending on resolution). Encoder 111 may generate a lower quality I-frame $I_0$ and enhancement layers $L_1$, $L_2$, and $L_3$ corresponding to lower quality I-frame $I_0$. In the example, lower quality I-frame $I_0$ may have a size of 200 kB and each of enhancement layers $L_1$, $L_2$, and $L_3$ may have a size of about 100 kB. As previously described, in some examples, instead of dividing an I-frame 120 to generate lower quality I-frame $I_0$, encoder 111 may generate lower quality I-frame L and/or enhancement layers $L_1$, $L_2$, and $L_3$ from previously un-encoded and/or uncompressed video data, such as video data 190 depicted in FIG. 1B.

As described previously, each of enhancement layers $L_1$, $L_2$, and $L_3$ may be used to improve lower quality I-frame $I_0$. For example, enhancement layers $L_1$, $L_2$, and $L_3$ may include image data combinable with lower quality I-frame $I_0$ by an enhanced I-frame decoder of a recipient computing device to generate an enhanced quality I-frame $I_0'$. In the example, an enhanced I-frame decoder may be effective to combine enhancement layers $L_1$, $L_2$, and $L_3$ with lower quality I-frame $I_0$ to reassemble the initial full-quality I-frame, such as I-frame 120 depicted in FIG. 1.

The process may continue from operation 410 to operation 420 at which the first lower quality I-frame may be sent from the transmitter to the recipient device. For example, with reference to FIG. 1, transmitter 100 may be effective to send lower quality I-frame $I_0$ to recipient 130 over network 102.

The process may continue from operation 420 to operation 430 at which an enhancement layer of the plurality of enhancement layers is sent. For example, with reference to FIG. 2, transmitter 100 may send I-frame enhancement layer $L_1$ to recipient 130. In some examples, I-frame enhancement layer $L_1$ may be packaged together with an inter-coded frame in a hybrid block, such as hybrid block 208a depicted in FIG. 2. As previously described, hybrid blocks may include header data that may indicate to an enhanced I-frame decoder (such as decoder 131 depicted in FIGS. 1-3) the data corresponding to the inter-coded frame and the data corresponding to the I-frame enhancement layer in the particular hybrid block. Additionally, in various examples, the header data may indicate a particular I-frame with which the I-frame enhancement layer data is to be combined to generate an enhanced quality I-frame.

The process may continue from operation 430 to operation 440 at which a determination is made whether or not additional enhancement layers corresponding to the lower quality I-frame are to be sent. For example, with reference to FIG. 2, encoder 111 may determine that I-frame enhancement layer $L_2$ has not yet been sent to recipient 130. In some examples, encoder 111 may package I-frame enhancement layer $L_2$ together with an inter-coded frame such as P-frame 202b in a hybrid block 208b, as depicted in FIG. 2. The process may then return to operation 440 and enhancement layer $L_2$ may be sent to recipient 130 in hybrid block 208b. I-frame enhancement layers need not be sent together with inter-coded frames. In some examples, I-frame enhancement layers may be sent independently from other data. Additionally, I-frame enhancement layers may be sent out-of-band with respect to other video frames in video stream 142.

If a determination is made that no further enhancement layers remain to be sent, the process may continue from operation 440 to operation 450 at which the next frame in the video stream may be sent. For example, with reference to FIG. 2, if all enhancement layers $L_1$-$L_N$ have been sent from transmitter 100 to recipient 130, transmitter 100 may send the next frame of video stream 142 to recipient 130. In an example, the next frame in video stream 142 may be a P-frame. In such a case, the P-frame may be decoded using an enhanced I-frame as a reference frame. The enhanced I-frame may be generated by combining one or more of the transmitted I-frame enhancement layers and the lower quality I-frame. Indeed, in many cases, the full-quality I-frame (such as I-frame 120 depicted in FIG. 1A) may have been reassembled by a decoder of the recipient 130. In such a case, the P-frame may use the full-quality I-frame reassembled from the plurality of enhancement layers and the lower quality I-frame as a reference frame.

Figure 5:
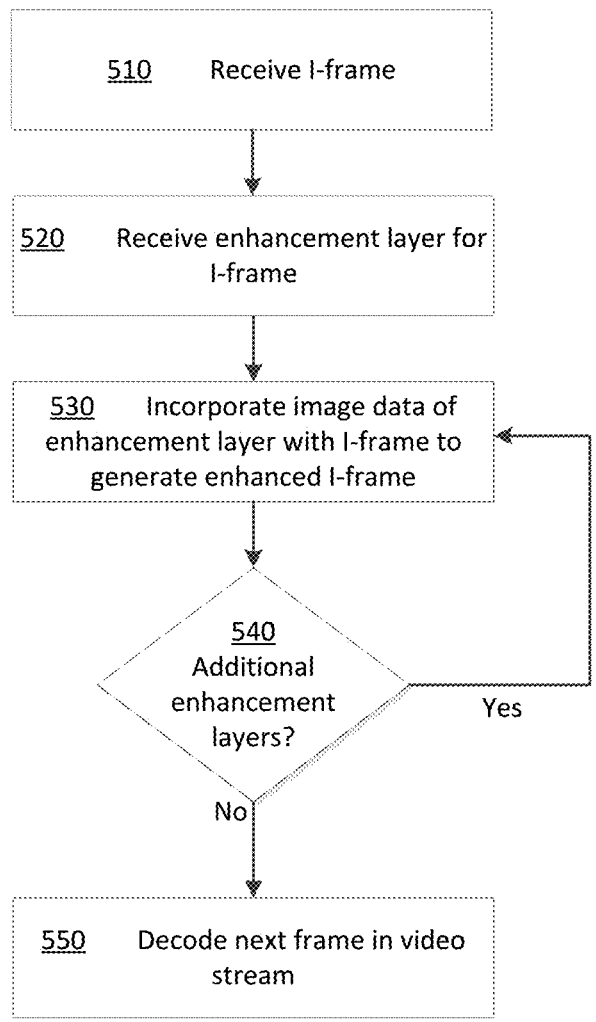
FIG. 5 depicts a flowchart illustrating an example process for enhanced I-frame encoding, in accordance with embodiments of the present disclosure.

FIG. 5 is a flowchart illustrating a first example process for enhanced I-frame decoding that may be used in accordance with the present disclosure. In some examples, the process of FIG. 5 may be performed by a recipient computing device (e.g., client) that requests a video streaming transmission, such as recipient 130 depicted in FIG. 1. The process of FIG. 5 may begin with a request by a recipient computing device that a video stream be sent. For example, recipient 130 may request that a video stream be sent from a transmitter computing device, such as transmitter 100 depicted in FIGS. 1A and 1B. In some examples, the transmission of the video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP).

The process of FIG. 5 may begin at operation 520 at which a first I-frame is received. For example, recipient 130 may identify a first I-frame (e.g., lower quality I-frame $I_0$ of FIG. 1A or 1B) of the requested video stream (e.g., video stream 142 depicted in FIG. 1). Recipient 130 may store the received I-frame (e.g., lower quality I-frame $I_0$) in a memory, such as buffer 132. The stored I-frame may then be used as a reference for subsequently received inter-coded frames of video stream 142.

The process may continue from operation 510 to operation 520 at which an enhancement layer is received for the stored I-frame. For example, with reference to FIG. 3, recipient 130 may receive I-frame enhancement layer $L_1$.

The process may continue from operation 520 to operation 530 at which the received enhancement layer may be combined with an I-frame to generate an enhanced I-frame. For example, with reference to FIG. 3, decoder 131 of recipient 130 may be effective to combine data in I-frame enhancement layer $L_1$ with the previously-stored I-frame to which I-frame enhancement layer $L_1$ corresponds. In the current example, I-frame enhancement layer $L_1$ may correspond to lower quality I-frame $I_0$, which may be stored in buffer 132. Accordingly, decoder 131 may combine data from I-frame enhancement layer $L_1$ (e.g., image data) with lower quality I-frame $I_0$ to generate an enhanced quality I-frame $I_0'$. The enhanced quality I-frame may be stored in a memory such as buffer 132, and in some cases, may overwrite lower quality I-frame $I_0$.

The process may continue from operation 530 to operation 540 at which a determination is made whether additional I-frame enhancement layers have been received. If so, the process may return to operation 540 and the additional I-frame enhancement layers may be combined by decoder 131 with the corresponding I-frame stored in buffer 132. For example, if I-frame enhancement layer $L_2$ is received, decoder 131 may determine that I-frame enhancement layer $L_2$ corresponds to enhanced quality I-frame $I_0'$. Accordingly, decoder 131 may combine data from I-frame enhancement layer $L_2$ (e.g., image data) with enhanced quality I-frame to generate another enhanced quality I-frame $I_0''$. Enhanced quality I-frame $I_0''$ may be a better reference for subsequently-received inter-coded frames relative to enhanced quality I-frame $I_0'$, as enhanced quality I-frame $I_0''$ may comprise more detailed image data relative to enhanced quality I-frame $I_0'$. The enhanced quality I-frame $I_0''$ may be stored in a memory such as buffer 132, and in some cases, may overwrite enhanced quality I-frame $I_0'$. As more I-frame enhancement layers are received, the reference quality may be progressively improved by combining the I-frame enhancement layers with the currently stored I-frame. In some examples, after receipt of all enhancement layers for a particular I-frame, decoder 131 may be effective to reassemble the full-quality I-frame (e.g., I-frame 120 depicted in FIG. 1) from the lower quality I-frame $I_0$ and the I-frame enhancement layers $L_1$-$L_N$.

The process may continue from operation 540 to operation 550 at which the next frame in the video stream may be decoded. For example, the next frame in video stream 142 received by recipient 130 may be a P-frame. In such a case, the P-frame may use the enhanced I-frame stored in buffer 132 as a reference frame. Indeed, in many cases, the full-quality I-frame (such as I-frame 120 depicted in FIG. 1) may have been reassembled by decoder 131 of the recipient 130. In such a case, decoder 131 may use the full-quality I-frame reassembled from the plurality of enhancement layers and the lower quality I-frame as a reference frame to decode the P-frame.

Among other benefits, a system in accordance with the present disclosure may allow progressive coding of high quality I-frames (and/or other reference frames) while optimizing transmission characteristics of the bitstream. Sending lower quality reference frames may reduce jitter, latency and network traffic spikes during transmission. Additionally, reference frame enhancement layers may be used to progressively "regenerate" or "reassemble" the original, high-quality reference frame. Reference frame enhancement layers (e.g., I-frame enhancement layers) may be sent together with inter-coded frames, such as P-frames and/or B-frames. In some cases, particular inter-coded frames may be selected for combination with the reference frame enhancement layers such that the combined hybrid blocks are unlikely to cause network congestion or other performance issues, based upon currently available bandwidth. Inter-coded frames received subsequently to reference frame enhancement layers may benefit from the enhanced reference frame resulting from the combination of the lower quality reference frame and the reference frame enhancement layers. Such subsequently-received inter-coded frames may be decoded using the enhanced reference frame. In various examples, video segments that include a relatively static background without a large amount of motion being depicted from frame-to-frame may be especially beneficial to encode using the techniques described herein. For such video segments, a lower quality I-frame, or other reference frame, may be acceptable for decoding subsequent inter-coded frames until an enhanced quality I-frame, or other reference frame, can be built up via the subsequently received enhancement layers. Examples of such "static background" video segments may include video conferences and/or other video-chat. Video segments that have large amounts of motion being depicted from frame-to-frame may not be ideal for the techniques described herein, as such "high motion" video segments may benefit more from higher quality I-frames and/or from using additional bandwidth to enhance P-frames. Examples of such high motion video may include a sports video, a video depicting splashing water, a video depicting a car chase, or other videos with a rapidly changing background.

Figure 6:
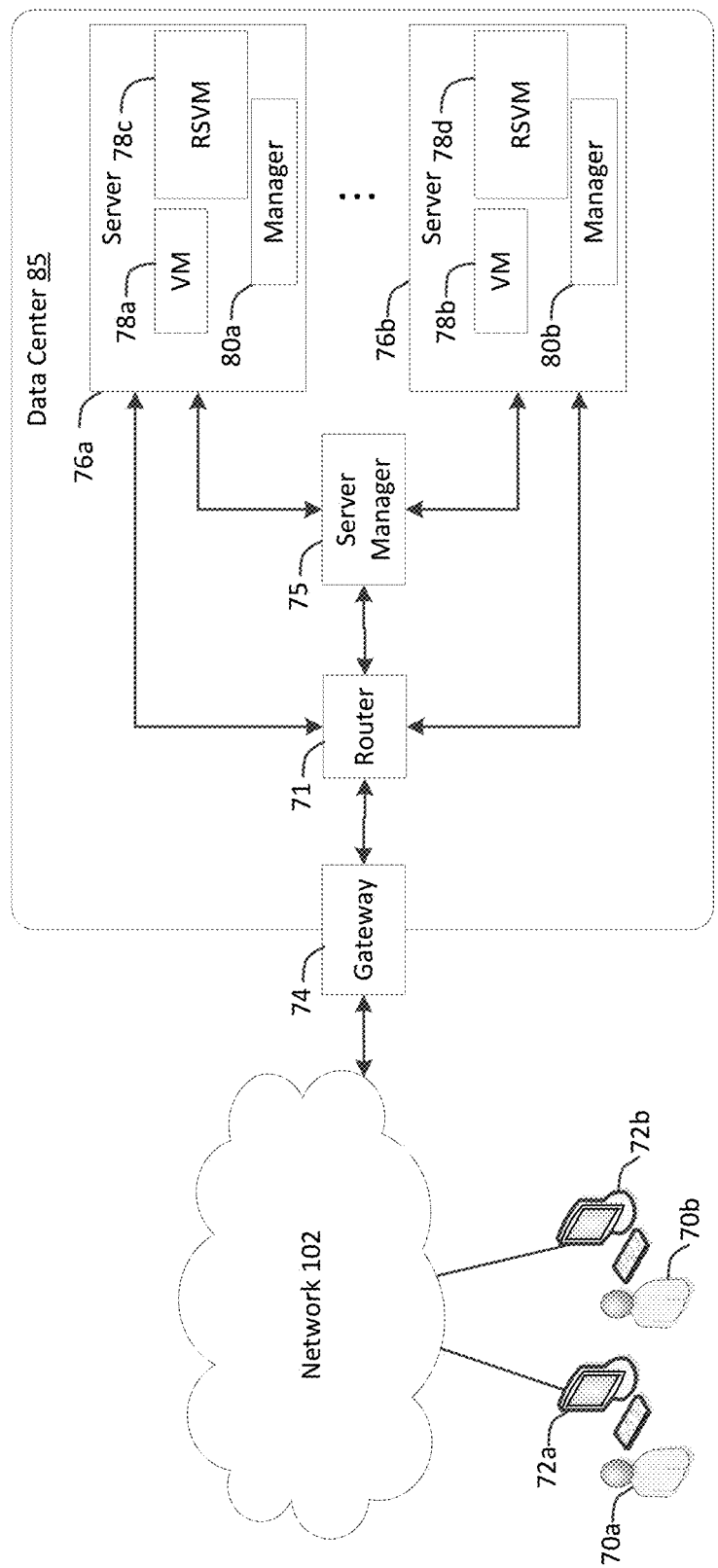
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. FIG. 6 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via network 102. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 102 may, for example, be a publicly accessible network of linked networks and possibly operated by various distinct parties, such as the Internet. In other embodiments, network 102 may be a private network, such as a corporate or university network that is wholly or partially inaccessible to non-privileged users. In still other embodiments, network 102 may include one or more private networks with access to and/or from the Internet.

Network 102 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76*a* and 76*b*. Router 71 may also be connected to gateway 74, which is connected to network 102. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76*a* and 76*b*. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
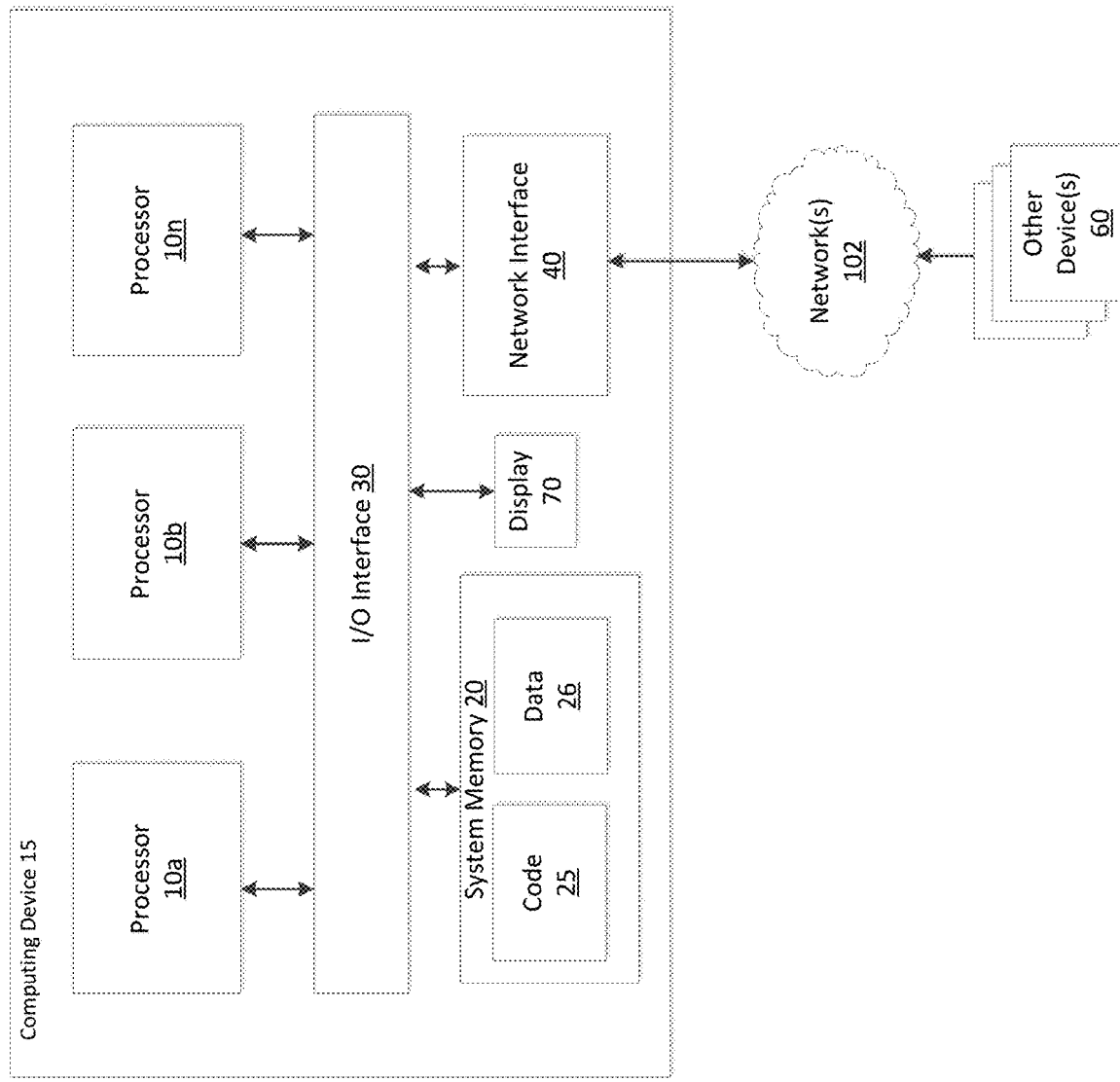
FIG. 7 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30. In various other examples, computing device 15 may include a display 70 effective to display video stream 142 and/or other graphics.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA. In an example where transmitter 100 (depicted in FIGS. 1A and 1B, for example) is implemented by computing device 15, encoder 111 may be implemented by one or more of processors 10. In some examples, encoder 111 may comprise dedicated hardware, while in other examples, encoder 111 may be software executable by one or more of processors 10. In still other examples, encoder 111 may comprise some combination of hardware and software. For example, encoder 111 may be implemented through a combination of instructions stored in system memory 20 and executable by one or more of processors 10 and one or more dedicated processors, such as a graphical processing unit (GPU), application specific integrated circuit (ASIC), field programmable gate array (FPGA), or the like. Similarly, one or more of processors 10 may be effective to implement the network characteristics monitor 114 described with reference to FIG. 1B. System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 20 as code 25 and data 26. In various examples, system memory 20 may comprise one or more of the buffers (e.g., buffer 132) described above with respect to FIGS. 1-3.

In an example where recipient 130 (depicted in FIGS. 1A and 1B, for example) is implemented by computing device 15, decoder 131 may be implemented by one or more of processors 10. In some examples, decoder 131 may comprise dedicated hardware, while in other examples, decoder 131 may be software executable by one or more of processors 10. In still other examples, decoder 131 may comprise some combination of hardware and software. For example, decoder 131 may be implemented through a combination of instructions stored in system memory 20 and executable by one or more of processors 10 and/or one or more dedicated processors, such as a graphical processing unit (GPU), application specific integrated circuit (ASIC), field programmable gate array (FPGA), or the like. Similarly, one or more of processors 10 may be effective to implement the playback component 133 described with reference to FIG. 1B.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 102, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of sending a video stream, the method comprising:
    identifying, by a server device, an intra-coded frame (I-frame) data of video data;
    identifying first image data of the I-frame data, the first image data comprising first frequency band pixel data of the I-frame data;
    generating first I-frame enhancement layer data comprising the first image data;
    identifying second image data of the I-frame data, the second image data comprising second frequency band pixel data of the I-frame data, wherein the second frequency band is different from the first frequency band;
    generating second I-frame enhancement layer data comprising the second image data;
    generating lower quality I-frame data by deleting at least the first image data and the second image data from the I-frame data;
    generating a first hybrid block including the first image data by generating a first payload of a first transmission packet, the first payload including the first I-frame enhancement layer data and first inter-coded data, the first inter-coded data comprising at least one of first P-frame data and first B-frame data;
    generating a second hybrid block including the second image data by generating a second payload of a second transmission packet, the second payload including the second I-frame enhancement layer data and second inter-coded data, the second inter-coded data comprising at least one of second P-frame data and second B-frame data;
    sending the lower quality I-frame data to at least one recipient device;
    sending the first hybrid block to the at least one recipient device, wherein the recipient device is effective to combine the first frequency band pixel data with the lower quality I-frame data to produce first enhanced quality I-frame data;
    receiving, by the at least one recipient device, the first hybrid block;
    identifying the first inter-coded data of the first hybrid block;
    identifying the first I-frame enhancement layer data of the first hybrid block;
    incorporating, by the at least one recipient device, the first frequency band pixel data of the first I-frame enhancement layer data with the lower quality I-frame data to produce the first enhanced quality I-frame data; and
    decoding, by the at least one recipient device, the first inter-coded data using the first enhanced quality I-frame data as a reference frame.

2. The method of claim 1, further comprising:
    sending the second hybrid block from the server device to the at least one recipient device;
    receiving, by the at least one recipient device, the second hybrid block;
    identifying the second inter-coded data of the second hybrid block;
    identifying the second I-frame enhancement layer data of the second hybrid block;
    incorporating, by the at least one recipient device, the second frequency band pixel data of the second I-frame enhancement layer data with the first enhanced quality I-frame data to produce second enhanced quality I-frame data; and
    decoding, by the at least one recipient device, the second inter-coded data using the second enhanced quality I-frame data as a reference frame.

3. A method of encoding and sending video, the method comprising:
    generating first reference frame data comprising first frequency band pixel data;
    generating first enhancement layer data corresponding to the first reference frame data, the first enhancement layer data comprising second frequency band pixel data;
    generating second enhancement layer data corresponding to the first reference frame data, the second enhancement layer data comprising third frequency band pixel data;
    sending, by at least one server computing device to at least one client device, the first reference frame data;
    generating first frame data, the first frame data comprising a first hybrid block including the first enhancement layer data, first indicator data, and first inter-coded frame data, the first inter-coded frame data comprising at least one of first P-frame data or first B-frame data;
    sending, by the at least one server computing device to the at least one client device, the first frame data;
    generating second frame data, the second frame data comprising a second hybrid block including the second enhancement layer data, second indicator data, and second inter-coded frame data, the second inter-coded frame data comprising at least one of second P-frame data or second B-frame data;
    sending, by the at least one server computing device to the at least one client device, the second frame data;
    receiving, by the at least one client device, the first frame data;
    identifying the first inter-coded frame data of the first frame data using the first indicator data;
    identifying the first enhancement layer data of the first frame data using the first indicator data;
    incorporating, by the at least one client device, the first enhancement layer data of the first frame data with the first reference frame data to generate second reference frame data; and decoding, by the at least one client device, the first inter-coded frame data using the second reference frame data as a reference frame.

4. The method of claim 3, further comprising:
encoding the first reference frame data with a first reference quality, wherein the first reference quality is lower than a second reference quality of the second reference frame used to generate the first reference frame data.

5. The method of claim 4, further comprising:
identifying image data of the second reference frame, wherein the image data comprises first pixel values of the first frequency band, second pixel values of the second frequency band, and third pixel values of the third frequency band;
generating the first reference frame data comprising the first pixel values of the image data;
generating the first enhancement layer data comprising the second pixel values of the image data; and
generating the second enhancement layer data comprising the third pixel values of the image data.

6. The method of claim 3, further comprising:
generating the first hybrid block by including the first enhancement layer data in a first packet for transmission with the first inter-coded frame data, wherein first image data of the first enhancement layer data is combinable with the first reference frame data to produce first enhanced reference frame data; and
generating the second hybrid block by including the second enhancement layer data in a second packet for transmission with the second inter-coded frame data, wherein second image data of the second enhancement layer data is combinable with the first enhanced reference frame data to produce second enhanced reference frame data.

7. The method of claim 6, further comprising:
generating a header of the first hybrid block comprising the first indicator data, wherein first bits of the first indicator data identify the first inter-coded frame data, and second bits of the first indicator data identify the first enhancement layer data.

8. The method of claim 6, further comprising:
generating time stamp data for the first hybrid block, wherein the time stamp data identifies the first reference frame data from among other reference frames.

9. The method of claim 6, further comprising:
selecting a first size of the first inter-coded frame data or a second size of the first enhancement layer data such that a size of the first hybrid block is less than or equal to a target frame size.

10. The method of claim 6, further comprising:
selecting a first size of the first inter-coded frame data such that a size of the first hybrid block is within a tolerance band of a target frame size; and
selecting a second size of the first reference frame data that is within the tolerance band of the target frame size.

11. The method of claim 3, further comprising selecting a size of the first reference frame data that is less than or equal to a target frame size.

12. A method of decoding video, the method comprising:
receiving first reference frame data comprising first frequency band pixel data;
decoding the first reference frame data;
receiving a first hybrid block comprising first reference frame enhancement layer data first indicator data, and first inter-coded frame data, the first inter-coded frame data comprising at least one of first P-frame data or first B-frame data, and the first reference frame enhancement layer data comprising second frequency band pixel data, wherein first bits of the first indicator data identify the first inter-coded frame data, and second bits of the first indicator data identify the first reference frame enhancement layer data;
identifying the first reference frame enhancement layer data from the first hybrid block using the second bits of the first indicator data;
generating first enhanced reference frame data by combining first image data of the first reference frame enhancement layer data with the first reference frame data; and
decoding the first inter-coded frame data by referencing the first enhanced reference frame data as a reference;
receiving a second hybrid block comprising second reference frame enhancement layer data, second indicator data, and second inter-coded frame data, the second inter-coded frame data comprising at least one of second P-frame data or second B-frame data, and the second reference frame enhancement layer data comprising third frequency band pixel data, wherein third bits of the second indicator data identify the second inter-coded frame data, and fourth bits of the second indicator data identify the second reference frame enhancement layer data;
generating second enhanced reference frame data by incorporating second image data of the second reference frame enhancement layer data with the first enhanced reference frame data; and
decoding the second inter-coded frame data by referencing the second enhanced reference frame data as the reference.

13. The method of claim 12, further comprising:
receiving a hybrid block comprising third inter-coded frame data combined with third reference frame enhancement layer data;
identifying the third inter-coded frame data of the hybrid block;
identifying the third reference frame enhancement layer data of the hybrid block; and
generating third enhanced reference frame data by incorporating third image data of the third reference frame enhancement layer data with the second enhanced reference frame data.

14. The method of claim 13, further comprising decoding the third inter-coded frame data by referencing the second enhanced reference frame data as the reference.

15. The method of claim 13, further comprising decoding the third inter-coded frame data by referencing the third enhanced reference frame data as the reference.

16. The method of claim 12, further comprising:
identifying that the second frequency band pixel data in the first reference frame enhancement layer data corresponds to the first reference frame data; and
incorporating the second frequency band pixel data with the first reference frame data to generate the first enhanced reference frame data.

17. The method of claim 12, further comprising:
receiving a third hybrid block comprising third inter-coded frame data and third reference frame enhancement layer data; and
receiving a fourth hybrid block comprising fourth inter-coded frame data and fourth reference frame enhancement layer data.

18. The method of claim 12, further comprising:
receiving third reference frame enhancement layer data from at least one server device, the third reference frame enhancement layer data comprising fourth frequency band pixel data; and generating third enhanced reference frame data by incorporating the fourth frequency band pixel data of the third reference frame enhancement layer data with the second enhanced reference frame data, wherein the third enhanced reference frame data corresponds to an original reference frame of a video.

19. The method of claim 12, further comprising overwriting the first enhanced reference frame data with the second enhanced reference frame data in a buffer.

* * * * *